United States Patent
Czarnetzki et al.

(10) Patent No.: US 6,486,761 B1
(45) Date of Patent: Nov. 26, 2002

(54) ELECTROMAGNETIC VALVE

(75) Inventors: Edwin Czarnetzki, Elz; Peter Volz, Darmstadt, both of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/786,844

(22) PCT Filed: Sep. 6, 1999

(86) PCT No.: PCT/EP99/06536

§ 371 (c)(1),
(2), (4) Date: May 16, 2001

(87) PCT Pub. No.: WO00/15988

PCT Pub. Date: Mar. 23, 2000

(30) Foreign Application Priority Data

Sep. 10, 1998 (DE) .......................... 198 41 333
Jul. 5, 1999 (DE) .......................... 199 30 969

(51) Int. Cl.$^7$ .................................. H01F 7/08
(52) U.S. Cl. .................. 335/220; 335/255; 251/129.15
(58) Field of Search ................. 335/220–229, 335/255, 256, 274; 251/129.1–129.18

(56) References Cited

U.S. PATENT DOCUMENTS 5,368,274 A * 11/1994 Falk et al. ............. 251/129.15
6,093,262 A * 7/2000 Bouldin ................... 148/313

FOREIGN PATENT DOCUMENTS

| DE | 37 16073 | 4/1988 |
| DE | 42 21 988 | 1/1994 |
| DE | 42 39 369 | 5/1994 |
| DE | 44 21 947 | 6/1995 |
| DE | 196 28 139 | 11/1997 |
| DE | 196 54 322 | 6/1998 |
| JP | 56 016653 | 2/1981 |
| JP | 56 138580 | 10/1981 |
| JP | 59 232258 | 12/1984 |
| JP | 01 301836 | 12/1989 |
| JP | 06 074357 | 3/1994 |
| JP | 10 008219 | 1/1998 |

OTHER PUBLICATIONS

Search Report of the German Patent Office for Application No. 19930969.8 (No date).

* cited by examiner

*Primary Examiner*—Lincoln Donovan
(74) *Attorney, Agent, or Firm*—Rader, Fishman & Grauer PLLC

(57) ABSTRACT

An electromagnetic valve including a valve housing machine from free cutting steel wherein the housing and the valve's magnetic core are made from identical, high-alloyed chromium and molybdenum constituents, and wherein the valve housing is fabricated from a chromium-nickel alloy and a high-alloyed chromium-molybdenum compound.

11 Claims, 3 Drawing Sheets

180
ELECTROMAGNETIC VALVE

RELATED APPLICATION

This application is 371 of PCT/EP99/06536 Sep. 06, 1999.

TECHNICAL FIELD

The present invention generally relates to valves and more particularly relates to electromagnetic valves.

BACKGROUND OF THE INVENTION

German patent application DE 42 21 988 A1 describes an electromagnetic valve which includes a pressure fluid passage between the valve closure member and the valve seat in its electromagnetically non-energized initial position. The valve housing is made from free-cutting steel. Because the selected free-cutting steel is difficult to weld, the sleeve-shaped housing portion which encloses the magnet armature is retained on the magnetic core by means of outside calking of the housing material. Further, the sleeve-shaped housing portion is made of an especially corrosion-resistant, austenitic material which differs from that of the valve housing, in order to reduce the risk of corrosion which is considerable especially in the outside area of the valve by all means.

An object of the present invention is to improve an electromagnetic valve of the type of construction known in the art to such effect that a functionally reliable electromagnetic valve is achieved by simple, low-cost measures, with the valve's housing lending itself to ease of welding with the sleeve-shaped housing portion. Another objective is to satisfy the demands placed on a high corrosion resistance, very good chip removing capacity, and high mechanical strength of the valve for large-scale series production at minimum possible costs.

DETAILED DESCRIPTION OF THE PREFERRED EMBODIMENTS

Figure 1:
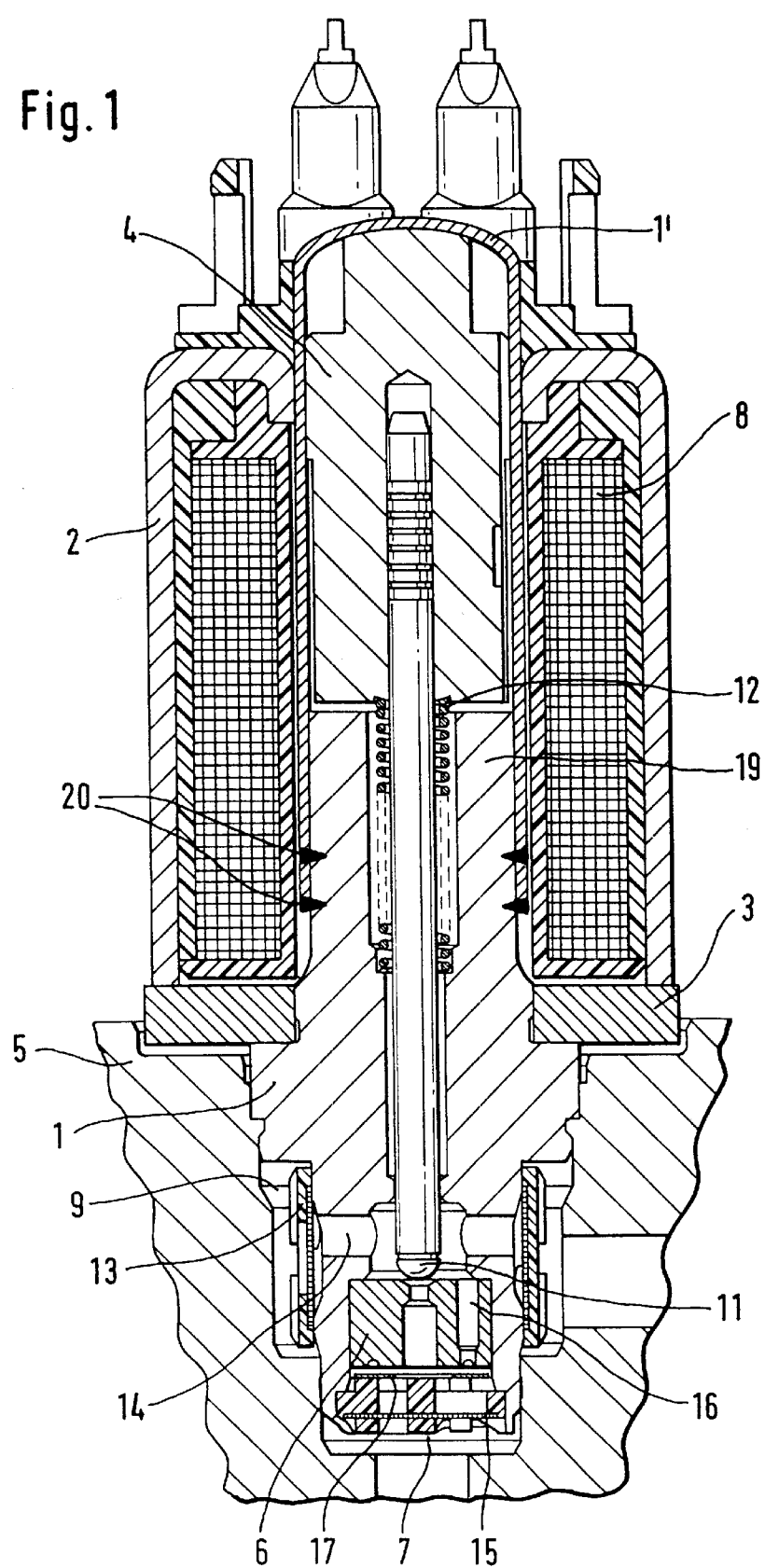
FIG. 1 shows an open electromagnetic valve which is non-energized electromagnetically in its initial position.

The embodiment of FIG. 1 shows a considerably enlarged view of the constructive details of an electromagnetic valve which is electromagnetically non-energized in its initial position and has adopted the open position. The valve housing 1 is configured as a cold impact forging part and is e.g. made of an X6CrMoS17 alloy or alternatively an X14CrMoS17 alloy, and the carbon content of the alloy in its amount is smaller than or equal to 0.2%, in order to favor metal-cutting operations in conformity with the demands of automation, on the one hand, and to impair the corrosion resistance to a least possible degree, on the other hand. Both materials are high-alloyed steels, well suited for large-scale series production and appropriate for a magnetic circuit. They not only are resistant to corrosion, but exhibit the necessary mechanical strength and especially good cutting properties and are well suited for laser welding, while costs in material and manufacture are very low. Therefore, the chemical composition of the material must not exceed the following percentage by mass:

carbon fraction of maximum 0.08%, silicon fraction of maximum 1%, mangane of maximum 1%, phosphor of maximum 0.045%. Besides, the percentages by mass in the alloy must range between 0.2% and 0.35% for sulphur, 16% to 18% for chromium, and 0.2% to 0.6% for molybdenum.

In addition, the valve housing 1 is designed in cartridge-type construction and retained in a stepped accommodating bore of an accommodating member 5 (valve block) by means of a calked or sheared engagement. In the present example, the accommodating member 5 is made of a material that is softer than the material of the electromagnetic valve, in order to displace the material volume of the accommodating member 5 which is preferably made of a light metal wrought alloy in the direction of the stepped portion 9 on the valve housing 1 which is provided with an undercut for valve attachment purposes. However, this does not preclude using the parts of the disclosed electromagnetic valve which are relevant for the present invention for any alternative type of attachment in an accommodating member 5 e.g. made of steel.

The initially mentioned material for the valve housing 1, the yoke ring 2, and the magnet armature 4 is conductive to magnetic flux in conformity with requirements, and the magnetic circuit between the yoke ring 2 and the valve housing 1 can be made either by way of a ferromagnetic annular part fitted to the valve housing 1 and/or by way of a ferromagnetic accommodating member 5 which carries the valve housing 1.

Upon scrutiny of the valve according to FIG. 1, it shows that the valve housing 1, on its end surface remote from the sleeve-shaped housing portion 1', includes an opening 7 which is adapted in its diameter to the valve seat member 6 and in which the valve seat member 6 is inserted without clearance. The depth of the opening 7 which is conformed to the nominal diameter of the valve seat member 6 in any case is chosen to be larger than the size of the valve seat member 6 so as to ensure a desired adjustment of the valve seat member in the opening 7, when required.

In the area of the stepped portion 9 in the accommodating member 5, the valve housing 1 includes a hollow-cylinder-shaped swivel part which is opened in the direction of the accommodating member 5. The swivel part is followed by a cylindrical extension, reduced in outside diameter, in the function of a magnetic core 19, which extends until into the valve coil 8 for the accommodation of the sleeve-shaped housing portion 1' closed on one side.

The sleeve-shaped housing portion 1' is closed like a dome and made from the high-alloyed steel mentioned hereinabove, preferably in a deep-drawing process. The housing portion 1' is attached in a weld joint to the magnetic core 19 in a pressure-fluid-tight fashion. According to the present invention, an austenite steel alloy with a maximum mass content that may amount to 0.06% for carbon, 1% for silicon, 2% for manganese, 0.015% for sulphur, and 0.11% for nitrogen is used for the sleeve-shaped housing portion 1' herein. For chromium, the percentage by mass in the alloy ranges between 17% and 18%, while 11% to 13% are permitted for nickel. The phosphorus percentile in the steel alloy may amount to 0.045%. Accordingly, for example a steel with the designation X4CrNi18-12 is applicable for the manufacture of the sleeve-shaped housing portion 1'. The combination of the above-described percentiles of the elements in the alloy which results in addition satisfies the requirement of an especially good laser weldability.

To improve corrosion protection and, thus, to protect the weld seam area, the weld seam 20 is arranged at the housing portion 1', preferably, as a double weld seam so that in each case the weld seam exposed to the influence of corrosion will assume the function of a so-called sacrificial seam.

Further, it can be seen in the illustration relating to FIG. 1 that the magnet armature 4, which is movably arranged inside the sleeve-shaped housing portion 1', is in abutment in the dome-shaped end area of the housing portion 1', while simultaneously the spherical valve closure member 11 shaped at a tappet remains remote from the valve seat member 6 when in its electromagnetically non-energized open switch position. For the above-mentioned initial position, a compression spring 12 is secured to the tappet-shaped portion of the valve closure member 11 and, with its one end, is supported in the bore of the extension configured as a magnetic core 19 and, with its other end, is supported on the magnet armature 4.

Still further details with respect to the embodiment of the valve according to FIG. 1 will be added in the following. These details are directed to the arrangement of an annular filter 13 which is disposed above the valve seat member in the mid-portion of the opening 7 of the valve housing 1 at the level of a transverse channel 14 which conveys pressure fluid.

Further, a plate-type filter 15 inserted into the opening is arranged below the valve seat member 6. A plate-type non-return valve 17 is arranged between the plate-type filter 15 and a bypass channel 16 that extends through the valve seat member 6. It is of course possible to use a spherical non-return valve instead of the plate-type non-return valve 17. Besides, it can be seen in the drawing that the end area of the valve housing 1 which abuts in the accommodating member 5 is chamfered like a knife, with the result that the knife part enters into the bore's bottom of the accommodating member 5 during the press-fit operation of the valve housing 1 to achieve a good sealing effect.

The materials, such as X6CrMoS17, X14CrMoS17, or X4CrNi18-12, which are used for the valve housing I and the housing portion 1' according to the present invention and which are welded to one another depending on the respective embodiment may be greased, waxed, or lacquered to improve the corrosion resistance on the surface, which may be effected at low-cost simple means in series manufacture.

Figure 2:
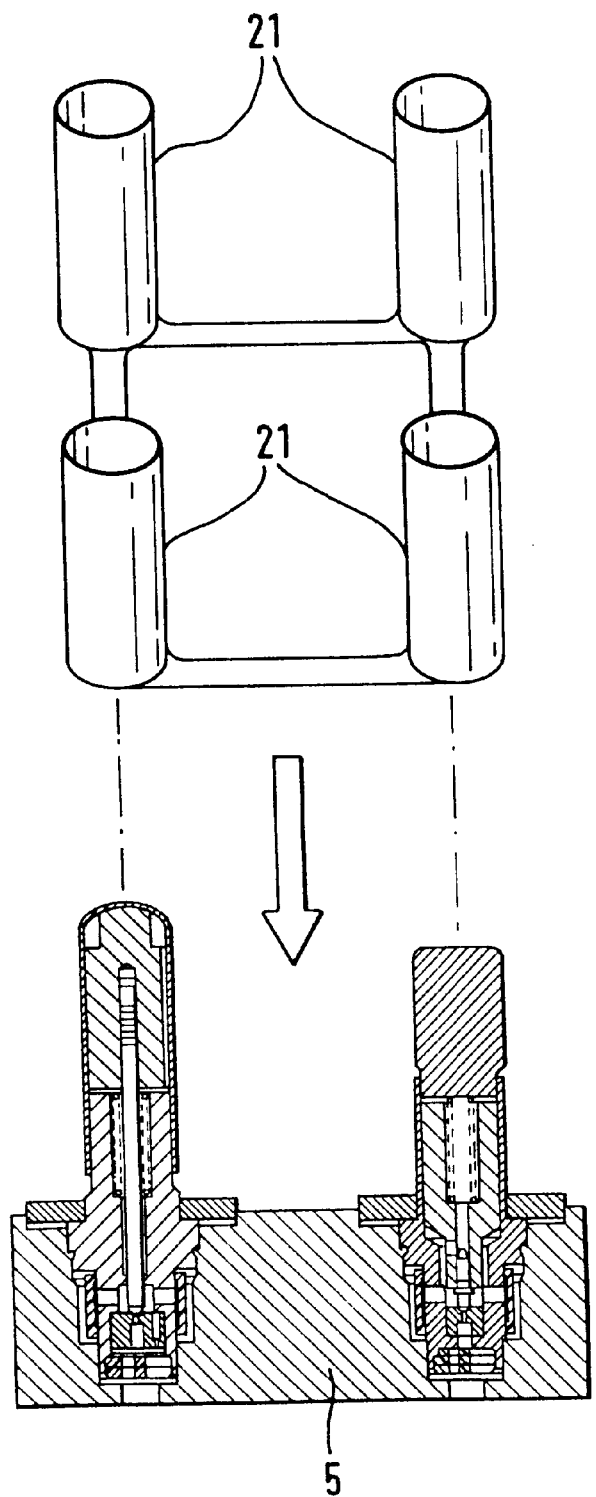
FIG. 2 is an appropriate corrosion protection measure in the form of a heat-shrinkable sleeve assembly unit for several electromagnetic valves arranged in an accommodating member.

Another, especially suitable alternative or supplementary corrosion protection measure for the outside valve surface is the use of a so-called heat-shrinkable sleeve 21 according to FIG. 2 which, in the capacity of a prefabricated assembly unit for several electromagnetic valves, can be slipped on simultaneously at the sleeve-shaped housing portions 1' until overlapping of the corrosion-sensitive weld seam 20. The advantage is that the need for the mentioned double weld seam is obviated. Advantageously, the heat-shrinkable sleeve 21 made of a polymer or an elastomer may be shrunk under the influence of heat onto any sleeve-shaped housing portion 1' in a vacuum-tight manner. An additional inside wetting or coating of the heat-shrinkable sleeve with an appropriate corrosion protective agent represents a supplemental corrosion protection measure. FIG. 2 shows in this respect a suitable heat-shrinkable sleeve assembly unit in the form of a group of four which can be handled independently, which is conformed in its dimensions to the valve configuration in the accommodating member 5 and is aligned to a square prior to the assembly by means of spacers that are injection-molded to the heat-shrinkable sleeves 21.

The electromagnetic valve according to FIG. 3 which will be described in the following shows in many single features a design that is comparable to the valve in FIG. 1. Therefore, only the differences with respect to the electromagnetic valve of FIG. 3, that will now be described, will be referred to. In the closed initial position of the electromagnetic valve according to the drawing, the valve closure member 11 connected to the magnet armature 4 by means of self-calked engagement will remain on the valve seat member 6 under the effect of a compression spring 12. The valve housing 1 which is configured as a cold impact forging part is equally connected by laser welding to the magnetic core 19, that is shown as a plug and is also configured as a cold impact forging part, in such a way that a transition area in the form of the housing portion 1' remains which is as thin-walled as possible. With respect to its wall thickness, this transition area is limited to a necessary degree of strength of the electromagnetic valve in order to minimize magnetic losses in this area. To prevent the so-called sticking of the magnet armature after electromagnetic energization, the end surface of the magnet armature 4 remote from the valve closure member 11 or, alternatively, the magnetic core 19 has a concave shape, with the result that an armature end surface oriented to an air slot is achieved without the necessity of inserting a washer. A possible exchange of pressure fluid between the areas outside and inside of the magnet armature 4 extends by means of a pressure compensation bore 18 as centrally as possible in the magnet armature 4, without there being the need for a pressure compensation groove at the periphery of the magnet armature 4 which has been used previously and unfavorably influenced the magnetic force. The movement of the magnet armature 4 at low temperature operation of the pressure fluid is considerably improved. Also, the conical configuration of the armature's end surface favors the pressure fluid distribution in the area of the magnet armature 4. What can easily be seen is the weld seam 20 which has a double design, and the top weld seam 20 is connected to the magnetic core 19 at the end of the sleeve-shaped housing portion 1' to avoid slot corrosion.

Figure 3:
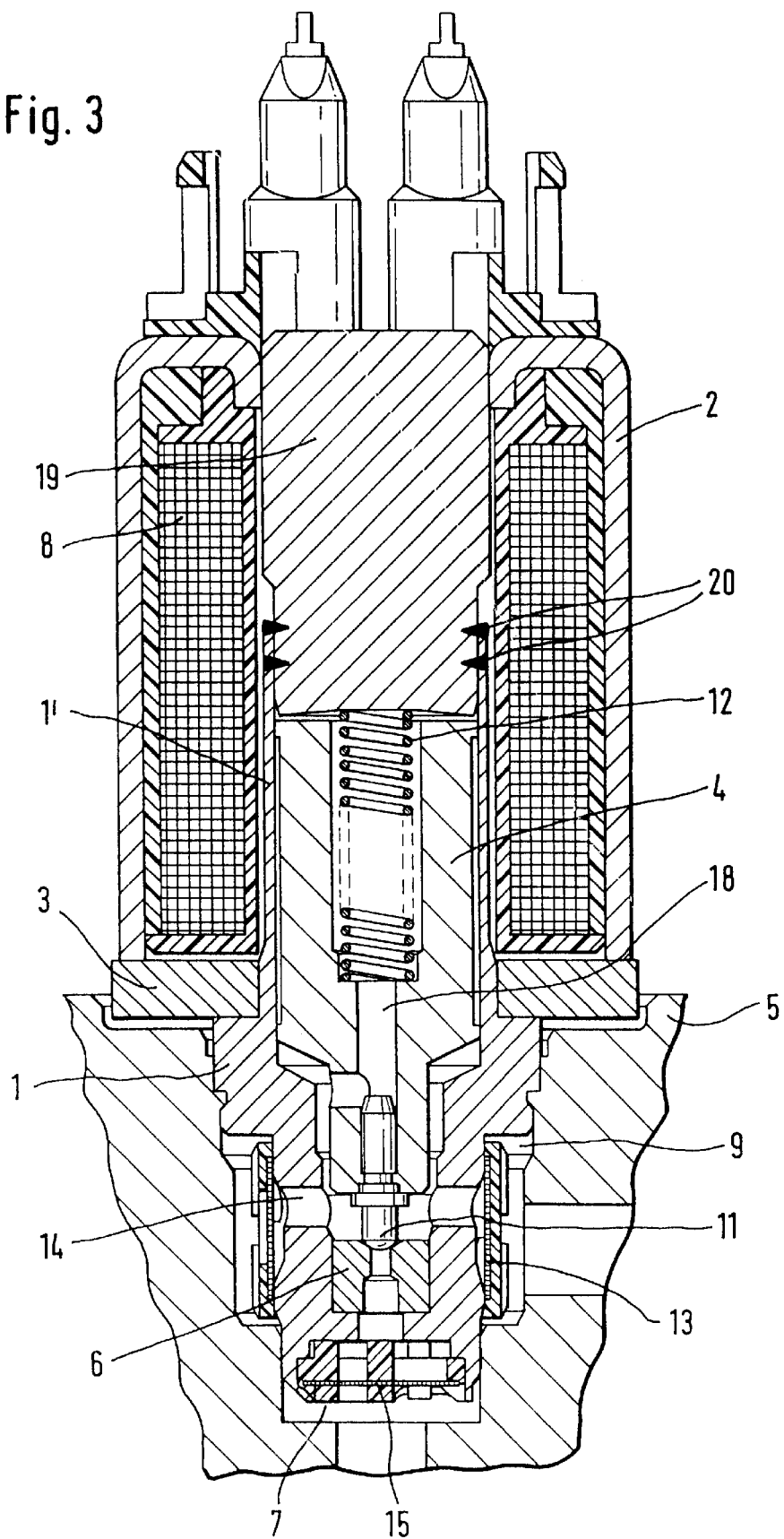
FIG. 3 is an alternative implementation of the present invention for a closed electromagnetic valve which is non-energized electromagnetically in its initial position.

The electromagnetic valve closed in its initial position, which is illustrated in FIG. 3, is characterized by an especially simple construction, in particular with respect to the bottle-shaped one-part contour of the valve housing 1 with the housing portion 1'. Exactly as with the subject matter of FIG. 1, the use of high-alloyed steels of the classification X6CrMoS17 or, alternatively, X14CrMoS17 for the valve housing 1 and the housing portion 1' ensures best chip cutting properties and laser welding properties at low costs in material in large-scale series production.

Due to identity, the electromagnetic valve according to FIG. 3 can utilize important elements, which have already been referred to in the description of the electromagnetic valve of FIG. 1, and the existing advantages in addition. Even if not all the details which are essential or inessential for the present invention and have so far been known from the description of FIG. 1 are indicated with respect to the embodiment of FIG. 3, they can be applied to FIG. 3 without restrictions.

By utilizing the suitable selection of new valve materials, the implementation of appropriate corrosion protection measures as described hereinabove, and the application of a laser weld joint permits achieving amazing improvements on the part of valve technology which combine all necessary valve characteristics such as good welding properties, very good chip cutting properties, good corrosion resistance and a great mechanical strength for the housing area for the low-cost large-scale series production.

What is claimed is:

1. Electromagnetic valve, comprising:

a housing having a sleeve-shaped portion, a valve closure member guided in the housing, said valve closure member effective for opening or closing a valve seat opening in the housing by means of a magnet armature which is operated by a valve coil and, wherein said valve closure member is movable along a magnetic core, wherein the housing or part of the housing is made by machining from free-cutting steel, wherein the housing and the magnetic core are made of a material of identical high-alloyed chromium and molybdenum constituents, and wherein the material of the sleeve-shaped housing portion selected from the group consisting of chromium-nickel alloy and a high-alloyed chromium-molybdenum compound further including a heat-shrinkable sleeve encompassing the sleeve-shaped housing portion.

2. Electromagnetic valve as claimed in claim 1, wherein the housing and the magnetic core is made of an X6CrMoS17 or X14CrMoS17 alloy.

3. Electromagnetic valve as claimed in claim 1, wherein a carbon content in the alloy of the material used for the housing and the magnetic core is smaller than or equal to 0.2% percentage by mass.

4. Electromagnetic valve as claimed in claim 1, further including a heat-shrinkable sleeve for covering at least one weld seam which connects the magnetic core to the housing portion.

5. Electromagnetic valve as claimed in claim 1, wherein the heat-shrinkable sleeve is made of a polymer or an elastomer.

6. Electromagnetic valve as claimed in claim 1, wherein the heat-shrinkable sleeve is shrunk under the influence of heat in a vacuum-tight manner at least onto the weld seam or, in addition, onto the sleeve-shaped housing portion.

7. Electromagnetic valve as claimed in claim 1, wherein said heat shrinkable sleeve has an inside surface coated with an appropriate corrosion protective agent.

8. Electromagnetic valve as claimed in claim 1, wherein said heat shrinkable sleeve is part of a plurality of heat shrinkable sleeves, combined into groups in a subassembly and assembly unit which can be handled independently and is conformed to the valve configuration in an accommodating member.

9. Electromagnetic valve as claimed in claim 1, wherein the housing and the magnetic core are coated with at least one of a wax, lacquer or grease layer.

10. Electromagnetic valve, comprising:

a housing having a sleeve-shaped portion, a valve closure member guided in the housing, said valve closure member effective for opening or closing a valve seat opening in the housing by means of a magnet armature which is operated by a valve coil and, wherein said valve closure member is movable along a magnetic core, wherein the housing or part of the housing is made by machining from free-cutting steel, wherein the housing and the magnetic core are made of a material of identical high-alloyed chromium and molybdenum constituents, and wherein the material of the sleeve-shaped housing portion selected from the group consisting of chromium-nickel alloy and a high-alloyed chromium-molybdenum compound, further including a heat-shrinkable sleeve for covering at least one weld seam which connects the magnetic core to the housing portion.

11. Electromagnetic valve, comprising:

a housing having a sleeve-shaped portion, a valve closure member guided in the housing and opening or closing a valve seat opening in the housing by means of a magnet armature which is operated by a valve coil and movable into abutment on a magnetic core, wherein the housing or part of the housing is made by machining from free-cutting steel, wherein the housing and the magnetic core are made of a material of identical high-alloyed chromium and molybdenum constituents, and wherein the material of the sleeve-shaped housing portion selected from the group consisting of chromium-nickel alloy and a high-alloyed chromium-molybdenum compound wherein the housing and the magnetic core are coated with at least one of a wax, lacquer or grease layer.

* * * * *